United States Patent [19]

Takahata

[11] Patent Number: 4,579,439

[45] Date of Patent: Apr. 1, 1986

[54] AUTOMATIC STOP CONTROL CIRCUIT FOR CAMERA

[75] Inventor: Hisatoshi Takahata, Sakura, Japan

[73] Assignee: Nippon Kogaku K. K., Tokyo, Japan

[21] Appl. No.: 650,851

[22] Filed: Sep. 14, 1984

[30] Foreign Application Priority Data

Sep. 20, 1983 [JP] Japan ................... 58-173661

[51] Int. Cl.⁴ .................. G03B 7/095; G03B 7/08
[52] U.S. Cl. .................. 354/446; 354/448; 354/484; 354/272
[58] Field of Search ............ 354/410, 418, 435–455, 354/484, 272

[56] References Cited

U.S. PATENT DOCUMENTS

| | | | |
|---|---|---|---|
| 3,953,867 | 4/1976 | Kondo | 354/484 |
| 4,339,186 | 7/1982 | Yamazaki | 354/441 |
| 4,389,108 | 6/1983 | Ohtsubo et al. | 354/484 |

Primary Examiner—Russell E. Adams
Attorney, Agent, or Firm—Shapiro and Shapiro

[57] ABSTRACT

An automatic stop control circuit is so constructed that in a period wherein the photo metering output signal is adversely affected by a counter electromotive pulse generated during the operative period of the electromagnetic release device for camera release, the operation of the automatic stop control circuit is prohibited. Note that the camera release herein includes a release operation for initiating a series of operations including the stop-down operation for taking a photograph, a mirror-up operation and a shutter running operation.

8 Claims, 4 Drawing Figures

AUTOMATIC STOP CONTROL CIRCUIT FOR CAMERA

BACKGROUND OF THE INVENTION

1. Field of the Invention

The present invention relates to an automatic stop control circuit for a camera.

2. Description of the Prior Art

A camera of a TTL light intensity feedback metering system is known. A camera of this type has an electromagnetic release device which is actuated so as to perform a shutter release operation based upon a switch signal in association with a shutter button. While a stop is being closed, light passed through the stop is measured. When the photo metering output signal is detected to have a predetermined relationship with a preset shutter speed and a preset film sensitivity, a stop latch electromagnetic device is actuated to stop the stop-down operation. A camera of this type adopts the shutter priority automatic exposure system or the programmed exposure control system. In such a camera, as the photographing operation is performed, the electromagnetic release device is actuated. When the pole piece is separated from the magnetic core of the electromagnet constituting the electromagnetic release device, a counter electromotive pulse is generated in a solenoid operated coil to adversely affect the photo metering output signal. Then, before the stop is set at a predetermined stop value, the stop-down stop electromagnetic device is actuated, and the stop is stopped. An erratic operation is particularly frequently caused when the brightness of an object is low and the output current from a photo metering light-receiving element is small. In order to prevent such an erratic operation, the photo metering circuit and the electromagnetic release device are separated from each other and arranged inside the camera. Alternatively, one of the photo metering circuit and the electromagnetic release device is electromagnetically shielded, so that the counter electromagnetic pulse wil not adversely affect the photo metering output signal. However, in a small space inside the camera, such a measure cannot be taken, and an erratic operation is difficult to prevent.

SUMMARY OF THE INVENTION

It is an object of the present invention to provide an automatic stop control circuit for a camera, which is capable of performing stop control at a practically satisfactory high precision even when a photo metering output signal is influenced by a counter electromotive pulse generated due to an electromagnetic release device.

According to the automatic stop control circuit of the present invention, in a period wherein the photo metering output signal is adversely affected by a counter electromotive pulse generated during the operative period of the electromagnetic release device for camera release, the operation of the automatic stop control circuit is prohibited. Note that the camera release herein includes a release operation for initiating a series of release operations including the stop-down operation for taking a photograph, a mirror up operation, and a shutter running operation.

BRIEF DESCRIPTION OF THE DRAWINGS

FIG. 4 is a graph showing changes in the photo metering output signal with changes in the counter electromotive pulse and the lens stop aperture after the release switch is turned on.

DETAILED DESCRIPTION OF THE PREFERRED EMBODIMENTS

Figure 1:
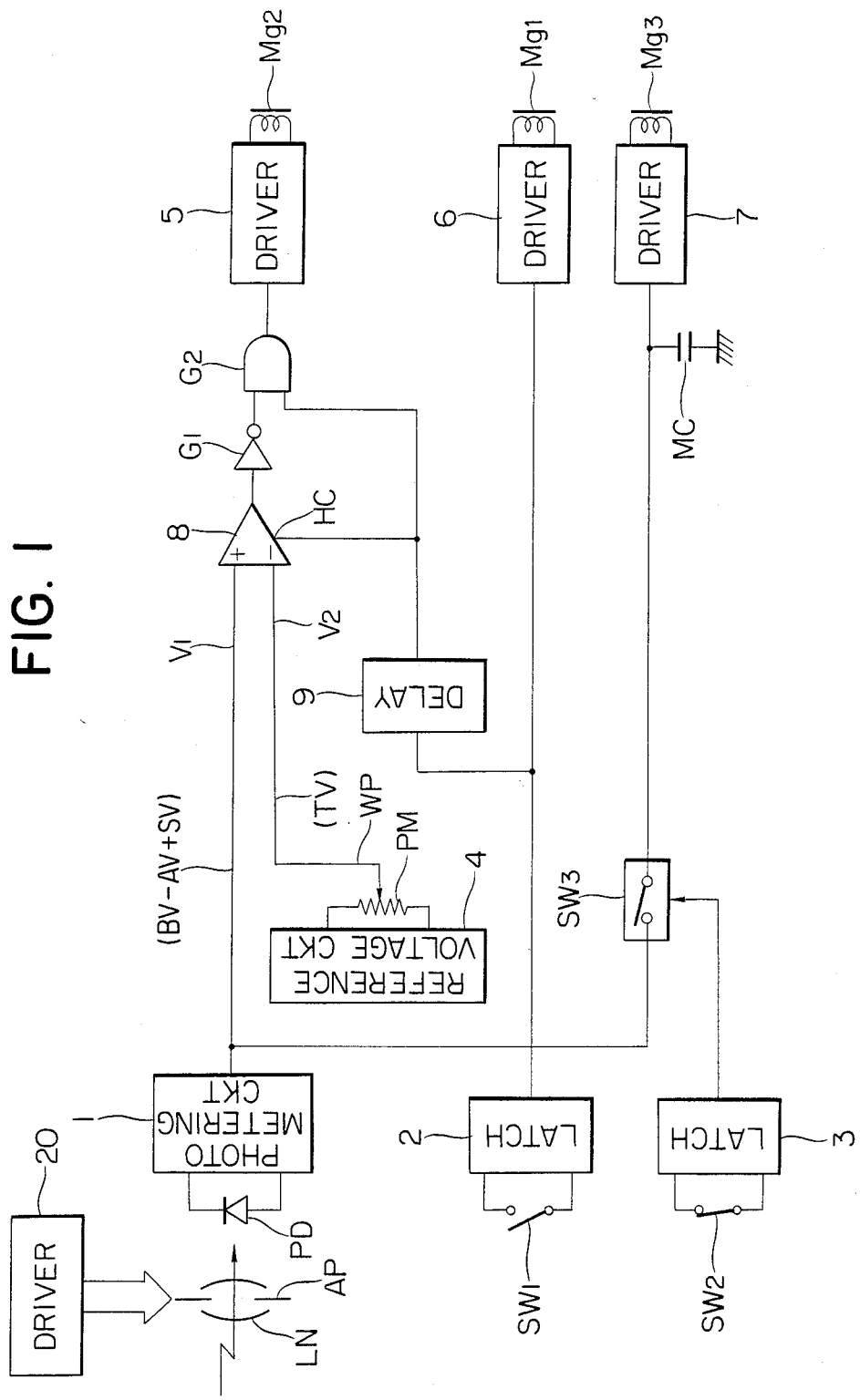
FIG. 1 is a block diagram of a first embodiment of the present invention.

Referring to FIG. 1, a photo metering circuit 1 including a photodetector PD receives by the photodetector PD light from an object through a photographic lens LN and a stop AP. The photo metering circuit 1 calculates a signal which corresponds to the output signal from the photodetector PD and the film sensitivity. The photo metering circuit 1 produces a voltage signal $V_1$ which is proportional to an exposure time expressed by $B_V - A_V + S_V$ by the brightness of the object, the aperture of the stop AP, and APEX values $B_V$, $A_V$ and $S_V$ of the film sensitivity in the additive system of photographic exposure (to be referred to as an APEX system hereinafter). The larger the aperture of the stop AP, the larger the voltage signal $V_1$.

A potentiometer PM is connected to a reference voltage circuit 4. A slider WP is set at a position corresponding to a preset shutter speed by manual operation. The output of the slider WP produces a voltage signal $V_2$ proportional to an APEX value $T_V$ of the shutter speed. The larger the preset shutter speed, the larger the output voltage $V_2$.

Figure 3:
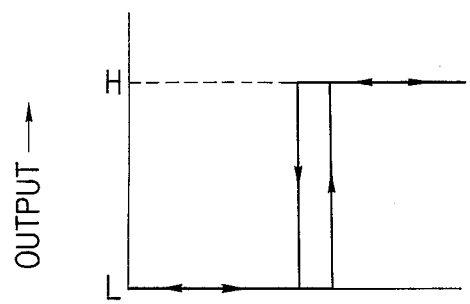
FIG. 3 is a graph showing the hysteresis characteristics of a comparator.

A comparator 8 compares the level of the output signal from the photo metering circuit, i.e., the voltage signal $V_1$ proportional to $B_V - A_V + S_V$ with the level of the output signal of the slider WP, i.e., the voltage signal $V_2$ proportional to $T_V$. The output from the comparator 8 is high level (to be referred to as "H" hereinafter) when the voltage level $V_1$ is higher than $V_2$ and is low level (to be referred to as "L" hereinafter) when the voltage level $V_2$ is higher than $V_1$. When the signal to a hysteresis operation control input terminal HC of the comparator 8 connected to the output of a delay circuit 9 is "H", the comparator 8 performs the hysteresis operation as shown in FIG. 3. The output from the comparator 8 is connected to the input of an inverter G1, and the output of the inverter G1 is connected to one input of an AND gate G2.

A release switch SW1 is turned on at the second stroke of the shutter release button. At the first stroke of the shutter release button, a power source switch (not shown) is turned on and the circuit is powered.

An output from a latch circuit 2 changes from "L" to "H" when the release switch SW1 is turned on and goes back to "L" when the exposure operation is completed and the shutter is closed. The output of the latch circuit 2 is connected to the delay circuit 9 and a magnetic driver 6. An output from the delay circuit 9 goes to "H" after a delay time from the time at which the input thereto goes to "H". This delay time will be described later.

The output of the delay circuit 9 is connected to the hysteresis operation control input terminal HC of the comparator 8 and is also connected to the other input terminal of the AND gate G2. The output of the AND gate G2 is connected to a magnet driver 5. A release magnet Mg1 is for causing the camera release operation and constitutes together with the magnetic driver 6 an electromagnetic release device.

A stop-down stop magnet Mg2 stops the stop-down operation of stop AP by a driver 20. When the inputs are "H", the magnetic drivers 6 and 7 supply currents to the magnet coils connected thereto to cancel the magnetic fluxes generated by permanent magnets. At this time, the pole pieces attracted to the respective magnets are pulled by springs and are released from the attracted states, thereby effecting the camera release operation and the stop-down stop operation.

A mirror switch SW2 is a switch which is synchronized with the up or down movement of the mirror. The mirror switch SW2 is turned off immediately before the up movement of the mirror and is turned on again after the down movement of the mirror is completed.

The output from a latch circuit 3 goes to "H" when the mirror switch SW2 is turned off and goes to "L" when the mirror switch SW2 is turned on.

An analog switch SW3 comprises a semiconductor element and is turned off when the output from the latch circuit 3 is "H". Therefore, when the mirror switch SW2 is turned off, the photo metering circuit 1 is disconnected from a memory capacitor MC. The memory capacitor MC then stores the output voltage from the photo metering circuit 1 when the connection thereto is interrupted.

A timer circuit 7 has a known configuration and starts counting when the exposure operation is started. The timer circuit 7 stops the exciting operation of a shutter magnet Mg3 for closing the shutter which causes the shutter trailing curtain running after a period of time which is determined in accordance with the stored voltage on the memory capacitor MC.

Before describing the operation of the embodiment shown in FIG. 1, the instability of the metering output signal due to a counter electromotive pulse generated by the electromagnetic release device will be described with reference to FIG. 4.

Figure 4:
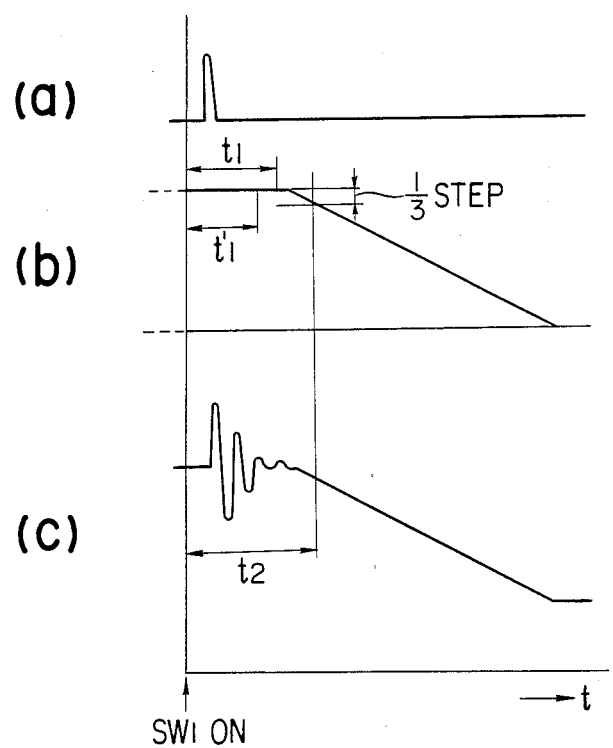

In FIG. 4, curve (a) shows the timing at which the counter electromotive pulse is generated after the release switch SW1 is turned on, curve (b) shows changes in the aperture, and curve (c) shows changes in the metering output signal.

Assume that the electromagnetic release device is operated, the release magnet Mg1 is energized, and the pole pieces are released from the attracted state. Then, a counter electromotive pulse is generated across the release magnet Mg1 due to abrupt changes in the reluctance of the magnetic circuit of the release magnet Mg1. The releasing operation of the pole pieces of the release magnet Mg1 is started in about 1 ms from energization thereof and is completed in about 1 ms from the start thereof. The generation period of the counter electromotive pulse is the same as the period from the start of the release operation to the end thereof of the pole pieces.

After the release operation of the pole pieces of the release magnet Mg1, the stop-down operation of the stop AP is started. However, the actual stop-down operation of the stop AP is started after a time interval t1 required for prerunning of the stop-down mechanism of the lens has elapsed. Although this time interval t1 changes in accordance with the type of lens adopted, it is generally about 5 ms.

Meanwhile, the metering output signal from the photo metering circuit 1 changes in accordance with changes in the aperture of the stop. However, then the metering output signal is subject to the adverse effect of the counter electromotive pulse and the counter electromotive pulse is generated, the metering output signal is deviated from the normal level. When the counter electromotive pulse disappears, the metering output signal starts to return to the normal level.

The time interval required for the metering output signal to return to the normal level after the energization of the release magnet Mg1 changes in accordance with the arrangement of the metering circuit and the electromagnetic release device in the camera, and the amplitude of the output current from the photodetector PD when the counter electromotive pulse is generated. This time interval may be longer than the time interval t1 before the stop-down operation is started. However, in this embodiment, it will be assumed, for purposes of description, that this time interval will never be longer than time interval t2 required for the aperture of the stop AP to be closed a ⅓ step from the open aperture.

However, this assumption is not generally applicable and may be different in accordance with engineering design, the materials of various members and the like.

The operation of the embodiment shown in FIG. 1 will now be described.

Also assume that the film mounted in the camera is wound up, the shutter release button is depressed to the first stroke, and the power source switch (not shown) is turned at the first stroke of the shutter release button.

In this state, the stop AP is in the open state. The output from the photo metering circuit 1 is a voltage signal $V_1$ which represents a shutter speed corresponding to the open aperture. Assume that this voltage signal $V_1$ is up to, for example, 1/60 sec, and the manually set shutter speed is 1/15 sec. Therefore, the noninverting input voltage $V_1$ of the comparator 8 is higher than the inverting input voltage $V_2$ by a voltage corresponding to two steps, and the output of comparator 8 is thus "H" and the output of inverter G1 "L". Since the release switch SW1 is OFF, an output from the latch circuit 2 is "L" and an output from the delay circuit 9 is also "L". Therefore, the output from the AND gate G2 is "L". When the shutter release button is depressed further in this state and the release switch SW1 is turned on, the output from the latch circuit goes to "H". A current flows to the solenoid operated coil of the magnet driver 6, and the stop-down operation of the stop AP is started. An output from the delay circuit 9 goes to "H" after a predetermined time interval t2 from the time at which the output from the latch circuit 2 goes to "H". Therefore, in the period of t2 from the energization of the release magnet Mg1, the hysteresis operation of the comparator 8 is prohibited. Furthermore, even if the output from the comparator 8 goes to "L" because both inputs of the AND gate G2 are not "H", the input to the magnet driver 5 is kept at "L" to prevent energization of the stop magnet Mg2 and to prevent the stopping of the stop-down operation.

When the stop-down operation of the stop AP is started and the stop-down level exceeds a ⅓ step, the output from the delay circuit 9 does to "H" to allow stopping the stop-down operation. When the output voltage signal $V_1$ from the photo metering circuit 1 decreases with changes in the aperure of the stop AP and becomes equal to the voltage signal representing the manually preset shutter speed, that is, when the relation $B_V-A_V+S_V=T_V$ is established, the output from the comparator 8 goes to "L". This state is stably held by the hysteresis operation. When the output from the comparator 8 goes to "L", both inputs to the AND gate G2 are "H". Therefore the output from the AND gate G2 goes to "H" and the magnet driver 5 is started, the stop-down stop magnet Mg2 is energized, and the stop AP stops the stop-down operation. In this manner, the stop AP is stopped at an aperture or stop value which provides the shutter speed of 1/15 sec.

After the stop-down operation is completed, the mirror of the camera starts moving upward. Immediately before the mirror is moved upward, the mirror switch SW2 is turned off, and the output from the latch circuit 3 goes to "H". The analog switch SW3 is turned off, the memory capacitor MC stores a voltage which provides a shutter speed of 1/15 sec, and the shutter magnet Mg3 is excited. When the upward movement of the mirror is completed, the shutter is opened, and the timer circuit is operated to perform the exposure operation.

In this manner, the hysteresis operation of the comparator 8 and the drive operation of the stop-down magnet Mg2 of the magnet driver 5 are prohibited during the interval t2, as shown in FIG. 4. Therefore, even if the metering output signal becomes lower than the voltage corresponding to the manually preset shutter speed due to the influence of the counter electromotive pulse in the time interval t2, the aperture of the stop AP can be controlled properly after the interval t2. During the time period between the intervals t1 and t2, the stop-down stop operation is not performed. However, after the time interval t2, although the stop AP has only been closed by a ⅓ step, no practical problem occurs. The time interval t2 is not limited to the ⅓ step and can be set arbitrarily only if it is an interval before the stop is closed by 1 step.

Figure 2:
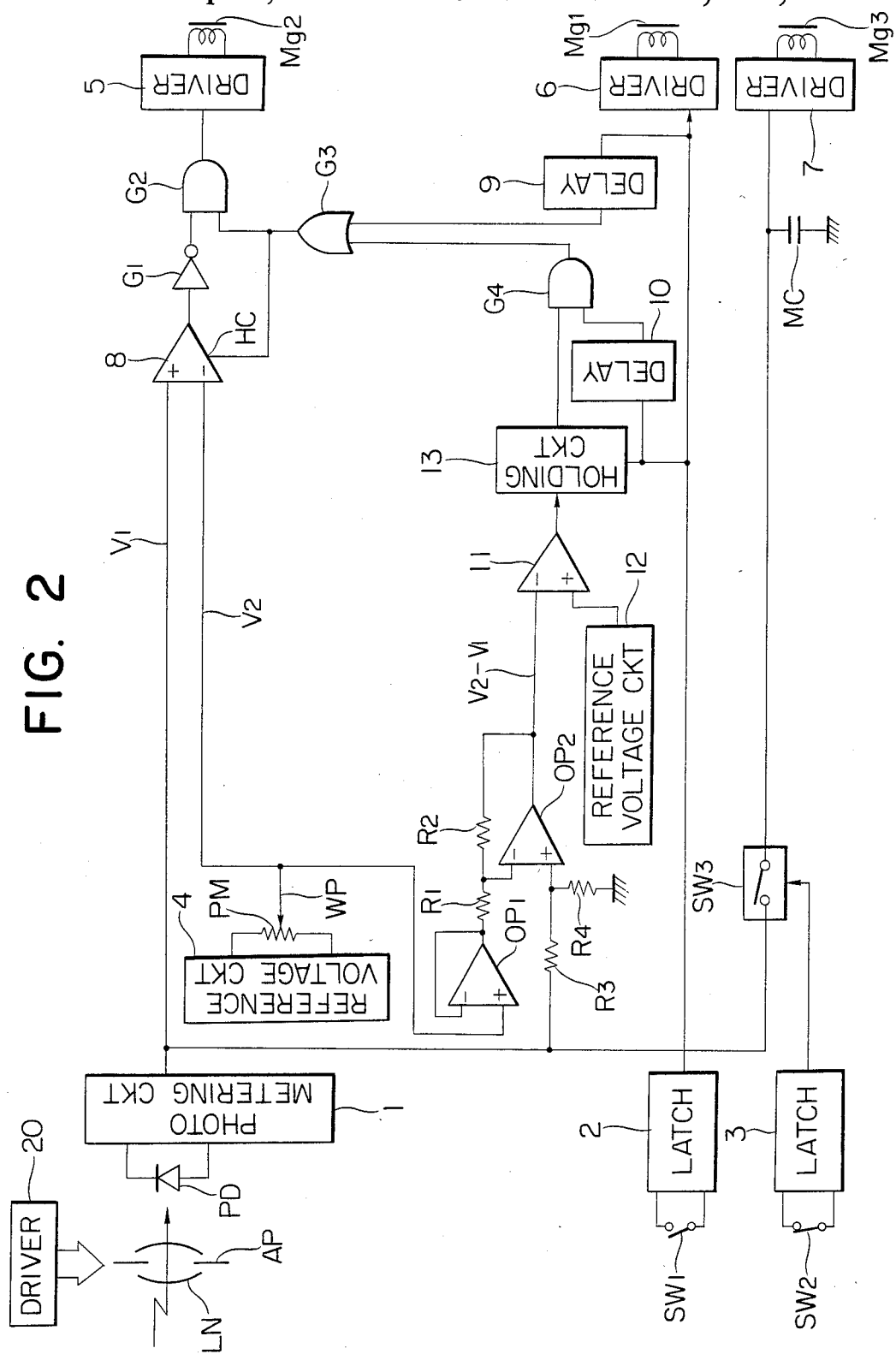
FIG. 2 is a block diagram of a second embodiment of the present invention.

FIG. 2 shows another embodiment of the present invention.

In the second embodiment shown in FIG. 2, the prohibition time interval t2 for prohibiting the stop-down operation or the stop control of the first embodiment shown in FIG. 1 is shortened to t1 upon detecting that a certain condition is met, e.g., the prospective aperture is between the open aperture and ⅓ step.

The same reference numerals as in FIG. 1 denote the same parts in FIG. 2, and a detailed description thereof will be omitted.

Referring to FIG. 2, an OP amplifier OP1 has its noninverting input terminal connected to the output of a slider WP, thereby constituting a voltage follower.

Resistors R1 to R4 having the same resistance and an OP amplifier OP2 constitute together a substracter. The substracter produces a difference voltage between the metering output voltage signal from a photo metering circuit 1 and a voltage signal corresponding to a manually preset shutter speed.

A comparator 11 compares the output voltage signal from a reference voltage circuit 12 with the voltage level of an output voltage signal from the OP amplifier OP2. When the former voltage level is higher than the latter, the output from the comparator 11 is "H". However, when the former voltage level is lower than the latter, the output from the comparator 11 is "L". The output voltage signal from the reference voltage circuit 12 has a voltage level corresponding to the ⅓ step. A data holding circuit 13 holds the output from the comparator 11, when the output from the latch circuit 2 goes from "L" to "H", for a time period in which the output from the latch circuit 2 is kept at "H".

An output from a delay circuit 10 goes to "H" after a predetermined delay time from the time at which the output from the latch circuit 2 goes from "L" to "H". The delay time of the delay circuit 10 is set to coincide with the time interval t1 in FIG. 4. The inputs of an OR gate G3 are connected to the output of an AND gate G4 and that of the delay circuit 9. the output of the OR gate G3 is connected to a hysteresis control input terminal HC of the comparator 8 and one input terminal of the AND gate G2.

The operation of the embodiment shown in FIG. 2 will be described below.

When the voltage signal $V_2$ corresponding to the manually preset shutter speed is higher than the voltage level of the metering output signal $V_1$ of the photo metering circuit 1 at the open aperture and when the level difference between the two signals is within the ⅓ step, the inverting input of the comparator 11 is higher than the noninverting input thereof. Therefore, the output from the comparator 11 is "H".

When the shutter release button is depressed and the release buttong SW1 is turned on, the output from the latch circuit 2 goes to "H". A current flows to a solenoid operated coil magnet Mg1 of a magnet driver 6. Then, the stop-down operation of the stop AP is started, and the output from the data holding circuit 13 is kept at "H".

Meanwhile, the outputs from the delay circuits 9 and 10 go to "H" after delay times t1 and t2, respectively, from the time at which the output from the latch circuit 2 goes to "H". However, since t2>t1, the output from the OR gate 3 goes to "H" after the time interval t1 from the time at which the output from the latch circuit 2 goes to "H". Thus, the stop-down stop operation can be performed.

When the voltage signal corresponding to the manually preset shutter speed is higher than the metering output signal from the photo metering circuit 1 by a voltage of a ⅓ step, the output from the comparator 11 is "L". In this case, the output from the data holding circuit 13 is kept at "L" while the shutter button is depressed, the release switch SW1 is turned on and the output from the latch circuit 2 is "H". Therefore, the output from the OR gate G3 goes to "H" after the delay time interval t2 of the delay circuit 9. Thus, the stop-down stop operation is prohibited during the time interval t2 as in the case of the embodiment shown in FIG. 1.

In this manner, in the embodiment shown in FIG. 2, when the aperture to be controlled is within the range between the full aperture and the aperture closed by the ⅓ step or less, the stop-down stop operation is prohibited only during the time interval t1 after the energization of the release magnet Mg1 in which the stop AP is actually closed. When the metering output signal does not fluctuate in a time interval between the time intervals t1 and t2 by the counter electromotive pulse, the aperture can be properly controlled from the open aperture to the minimum aperture. Even if the metering output signal fluctuates, since the control level is below the ⅓ step, the error is negligible.

In this embodiment, the time interval t1 (prerunning period) is a time interval from the turn-on time of the release switch SW1 to the time of actual stop-down operation. The time interval t2 is a time interval from the turn-on time of the release switch SW1 and the time at which the stop is closed by the ⅛ step. However, the present invention is not limited to this. For example, the time interval t1 may be preset to be an internal during which the metering output signal in the prerunning period is substantially stabilized. The time interval t2 may be any time interval corresponding to 1 step or less.

I claim:

1. A camera having drive means for performing a stop-down operation of a stop of a photographic lens in a direction toward a predetermined aperture value from a minimum aperture value in response to a release operation, including:
   (a) means for generating a release signal in response to the release operation;
   (b) means for generating an aperture signal corresponding to the aperture of said stop of said photographic lens;
   (c) means for detecting that the aperture of said stop of said photographic lens is a given aperture in accordance with said aperture signal and for generating a detection signal;
   (d) stopping means for stopping said stop-down operation of said drive means in response to said detection signal; and
   (e) prohibition means responsive to said release signal for prohibiting said stopping means from stopping said stop-down operation for a predetermined period.

2. A camera according to claim 1, further including:
   means for detecting that a difference between the minimum aperture value and said given aperture value falls within a predetermined range and for generating an output signal; and
   means for controlling said prohibition means so as to lessen said predetermined period by a predetermined time in response to the output signal.

3. A camera according to claim 1, wherein said stopping means includes:
   means for measuring an intensity of light from an object received through said photographic lens and for generating an output signal corresponding to the detected intensity; and
   aperture detecting means for detecting that an aperture of said photographic lens is a given aperture in accordance with the output signal from said measuring means and for generating a detection signal.

4. A camera according to claim 3, wherein said stopping means stops said stop-down operation in response to said detection signal.

5. A camera according to claim 4, wherein said prohibition means includes:
   gate means for prohibiting the transmission of said detection signal to said stopping means in response to said release signal; and
   means for releasing the prohibition of the transmission of the detection signal by said gate means after said predetermined period has elapsed.

6. A camera according to claim 1, wherein said prohibition means includes means for prohibiting the transmission of said detection signal to said stopping means.

7. A camera according to claim 1, further including electromagnetic means for starting said drive means in response to said release operation and wherein said electromagnetic means affects said aperture signal for a period shorter than said predetermined period in response to said release operation.

8. A camera having drive means for performing a stop-down operation of a stop of a photographic lens in a direction toward a predetermined aperture value in response to a release operation, including:
   (a) means for generating a release signal in response to the release operation;
   (b) stopping means for stopping said stop-down operation of said drive means; and
   (c) prohibition means responsive to said release signal for prohibiting said stopping means from stopping said stop-down operation for a predetermined period.

* * * * *